United States Patent
Ackermann et al.

(10) Patent No.: US 9,831,921 B2
(45) Date of Patent: Nov. 28, 2017

(54) CONTACTLESS PICK-UP OF A SIGNAL

(71) Applicant: PHILIPS LIGHTING HOLDING B.V., Eindhoven (NL)

(72) Inventors: Bernd Ackermann, Aachen (DE); Theodorus Johannes Petrus Van Den Biggelaar, Veldhoven (NL); Eberhard Waffenschmidt, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 136 days.

(21) Appl. No.: 14/903,055

(22) PCT Filed: Jul. 16, 2014

(86) PCT No.: PCT/EP2014/065193
§ 371 (c)(1),
(2) Date: Jan. 5, 2016

(87) PCT Pub. No.: WO2015/010973
PCT Pub. Date: Jan. 29, 2015

(65) Prior Publication Data
US 2016/0164574 A1    Jun. 9, 2016

(30) Foreign Application Priority Data

Jul. 26, 2013 (EP) .................... 13178197

(51) Int. Cl.
*H01F 27/42* (2006.01)
*H01F 37/00* (2006.01)
(Continued)

(52) U.S. Cl.
CPC .......... *H04B 5/0037* (2013.01); *H01F 27/24* (2013.01); *H01F 38/14* (2013.01); *H04B 3/548* (2013.01); *H04B 3/56* (2013.01); *H04L 12/6418* (2013.01)

(58) Field of Classification Search
USPC ............................................ 439/39; 307/104
See application file for complete search history.

(56) References Cited

U.S. PATENT DOCUMENTS 3,742,408 A * 6/1973 Jaeger ..................... H01F 38/14
330/174
4,264,827 A * 4/1981 Herzog .................... H04L 12/40
307/17
(Continued)

FOREIGN PATENT DOCUMENTS

| EP | 0447001 A2 | 9/1991 |
| WO | 2012038468 A1 | 3/2012 |
| WO | 2012099170 A1 | 7/2012 |

*Primary Examiner* — Adam Houston

(57) ABSTRACT

Cables (1, 2) comprise first and second conductors (1, 2) for transporting signals to be picked-up in contactless manners. At first/second locations (3, 4), the first and second conductors (1, 2) are at first/second distances from each other. The first locations (3) are neutral locations where the conductors (1, 2) are parallel. The second locations (4) are pick-up locations. The second distances are larger than the first distances. Pick-up devices for picking-up signals in a contactless manner from the cables (1, 2) comprise parts for defining minimum values of the second distances. These parts may comprise core-parts, such as center ends (10) of E-shaped magnetic cores further comprising outer ends (11, 12) and backs (13). Methods for installing pick-up devices comprise steps of at second locations (4) increasing a distance between the first and second conductors (1, 2) from a value of the first distance to a value of the second distance. Twin-cables (1, 2) or twin-lead-cables (1, 2) are suited well for allowing signals to be picked-up in contactless manners.

14 Claims, 3 Drawing Sheets

(51) Int. Cl.

| | |
|---|---|
| *H01F 38/00* | (2006.01) |
| *H04B 5/00* | (2006.01) |
| *H04B 3/54* | (2006.01) |
| *H04B 3/56* | (2006.01) |
| *H04L 12/64* | (2006.01) |
| *H01F 27/24* | (2006.01) |
| *H01F 38/14* | (2006.01) |

(56) References Cited

U.S. PATENT DOCUMENTS

| | | | | |
|---|---|---|---|---|
| 4,825,450 | A * | 4/1989 | Herzog | H04L 12/40 375/258 |
| 5,938,151 | A | 8/1999 | Takasan et al. | |
| 7,785,151 | B2 | 8/2010 | Feucht et al. | |
| 8,342,857 | B2 * | 1/2013 | Palli | H01R 13/6205 439/38 |
| 2004/0224539 | A1 * | 11/2004 | Boyd | H01R 13/6205 439/39 |
| 2004/0225804 | A1 * | 11/2004 | Leete | G06F 1/1632 710/305 |
| 2007/0072442 | A1 * | 3/2007 | DiFonzo | H01R 13/641 439/39 |
| 2016/0164574 | A1 * | 6/2016 | Ackermann | H04B 3/548 307/104 |
| 2016/0173168 | A1 * | 6/2016 | Waffenschmidt | H04B 5/0012 455/41.1 |
| 2016/0347269 | A1 * | 12/2016 | Breed | B60R 16/0207 |
| 2017/0164505 | A1 * | 6/2017 | Sarti | H05K 7/1492 |

* cited by examiner

CONTACTLESS PICK-UP OF A SIGNAL

CROSS-REFERENCE TO PRIOR APPLICATIONS

This application is the U.S. National Phase application under 35 U.S.C. §371 of International Application No. PCT/EP2014/065193, filed on Jul. 16, 2014, which claims the benefit of European Patent Application No. EP13178197.3, filed on Jul. 26, 2013. These applications are hereby incorporated by reference herein.

FIELD OF THE INVENTION

The invention relates to a cable comprising first and second conductors for transporting a signal to be picked-up in a contactless manner. The invention further relates to a pick-up device for picking-up a signal in a contactless manner from such a cable, to a system comprising such a cable and such a pick-up device, and to a method for installing such a pick-up device for picking-up a signal in a contactless manner from such a cable. Examples of such a pick-up device are interfaces and loads comprising such interfaces.

BACKGROUND OF THE INVENTION

U.S. Pat. No. 4,264,827 discloses a current mode data or power bus. A data bus comprises a pair of wires, twisted to form a succession of loops and short-circuited at both ends, together with an arbitrary number of bus couplers, one for each terminal. This way, a data signal or a power signal can be picked-up in a contactless manner.

SUMMARY OF THE INVENTION

It is an object of the invention to provide an improved cable. Further objects of the invention are to provide an improved pick-up device, a system and an improved method.

According to a first aspect, a cable is provided comprising first and second conductors for transporting a signal to be picked-up in a contactless manner, the first and second conductors at a first location being parallel to each other and at a first distance from each other, the first and second conductors at a second location being at a second distance from each other, the first location being a neutral location, the second location being a pick-up location, and the second distance being larger than the first distance.

A cable comprises first and second conductors for transporting a signal to be picked-up in a contactless manner. The transport of the signal may be a main function of the cable, in which case the cable has been installed to transport this signal, or the transport of the signal may be an auxiliary function of the cable, in which case the cable has been installed for transporting another signal. At a first, neutral location, the first and second conductors are located parallel to each other and at a first distance from each other. At a second, pick-up location, the first and second conductors are located at a second distance from each other. By having made the second distance larger than the first distance, the cable is suited well to be used in combination with a pick-up device. At the first location, where no pick-up device is installed or is going to be installed, the first and second conductors are located parallel to each other and relatively close to each other, and the cable can be handled well. At the second location, where the pick-up device is installed or is going to be installed or has been installed, the first and second conductors are located relatively away from each other, which offers room for the pick-up device. Such a cable is suited well for picking-up a signal in a contactless manner.

Conductors which are located parallel to each other comprise conductors which are not twisted with respect to each other. Compared to the twisted wires as disclosed in U.S. Pat. No. 4,264,827, parallel conductors are more easy to handle and show a reduced chance of being caught by an obstacle, parallel conductors can be installed faster and can be produced at reduced costs, and parallel conductors do not require a pick-up device to be located at a precise location defined by one or two loops and make it impossible for a pick-up device to be installed wrongly when for example using non-adjacent loops and this allows persons without electrical training to install the pick-up device etc.

An embodiment of the cable is defined by the first conductor being surrounded by a first isolation layer, the second conductor being surrounded by a second isolation layer, and the first distance being substantially equal to a sum of thicknesses of the first and second isolation layers. A sum of the thicknesses is a sum of local thicknesses present on a line from a first center of the first conductor to a second center of the second conductor. Another thickness which is not present on this line may have the same value as the local thickness (symmetrical isolation layer) or may have a different value (asymmetrical isolation layer).

An embodiment of the cable is defined by the first and second isolation layers at the first location being interconnected in a disconnectable manner, and the first and second isolation layers at the second location being disconnected. Such a cable is for example a loudspeaker cable.

An embodiment of the cable is defined by the respective first and second conductors at the second location passing respective first and second sides of a core-part, and a value of the second distance being substantially equal to or larger than a thickness of the core-part measured from the first side to the second side. A core-part should fit between the first and second conductors at the second location.

An embodiment of the cable is defined by the core-part comprising a center end of an E-shaped magnetic core further comprising two outer ends and a back. An E-shaped magnetic core is suited well for picking-up a signal in a contactless manner.

An embodiment of the cable is defined by the cable being a flexible cable, and/or each conductor comprising two or more strands. A flexible cable is a cable which can be bent relatively easily and which can make a curve having a radius preferably equal to or smaller than 5 cm, more preferably equal to or smaller than 2 cm, and most preferably equal to or smaller than 1 cm. A conductor comprising two or more strands shows an improved high-frequency behavior. The single strands may each have an isolative layer or not. In a so-called Litz construction, these single strands are isolated, but this is not necessary here. The purpose of a Litz construction is to suppress additional losses due to eddy currents. Measurements show that these losses are still sufficiently small when using single strands that are not isolated. An advantage is that such cables are readily available. This construction is e.g. used in speaker cables. A major reason for using a plurality of single strands per conductor is not to suppress eddy currents but to make the cable (more) flexible. Next to copper, the cable can also be made from aluminum. A well-known disadvantage of aluminum is that it is difficult to make galvanic connections since aluminum is difficult to solder. This is less of a problem here since galvanic connections need only be made at the begin and at the end of the cable.

An embodiment of the cable is defined by the signal being a power signal, and/or the contactless manner comprising an inductive manner. A power signal can power a load, where a data signal can usually not power a load. Examples of such a load are lamps such as for example light emitting diode circuits comprising one or more light emitting diodes of whatever kind and in whatever combination. A power signal can be picked-up well in an inductive manner.

According to a second aspect, a pick-up device is provided for picking-up a signal in a contactless manner from a cable comprising first and second conductors, the first and second conductors at a first location being parallel to each other and at a first distance from each other, the first and second conductors at a second location being at a second distance from each other, the first location being a neutral location, the second location being a pick-up location, the second distance being larger than the first distance, the pick-up device comprising a part for defining a minimum value of the second distance.

An embodiment of the pick-up device is defined by the part of the pick-up device comprising a core-part, a size of the part of the pick-up device being substantially equal to a thickness of the core-part measured from a first side to a second side of the core-part, and the respective first and second conductors at the second location passing the respective first and second sides of the core-part.

An embodiment of the pick-up device is defined by the pick-up device comprising an E-shaped magnetic core comprising a center end, two outer ends and a back, and the core-part comprising the center end.

An embodiment of the pick-up device is defined by the first conductor and/or the second conductor forming a primary winding of the pick-up device, and the pick-up device further comprising a secondary winding for providing the signal.

An embodiment of the pick-up device is defined by further comprising a processing unit and/or a load. The processing unit may be a data processing unit and/or a power processing unit. The load may be any kind of load.

According to a third aspect, a system is provided comprising the cable as defined above and comprising the pick-up device as defined above.

According to a fourth aspect, a method is provided for installing a pick-up device for picking-up a signal in a contactless manner from a cable comprising first and second conductors, the first and second conductors at a first location being parallel to each other and at a first distance from each other, the method comprising a step of at a second location, increasing a distance between the first and second conductors from a value of the first distance to a value of a second distance, the first location being a neutral location, the second location being a pick-up location, and a minimum value of the second distance being defined by a size of at least a part of the pick-up device.

A basic idea is that a so-called twin-cable or twin-lead-cable is to be used for transporting a signal and for allowing the signal to be picked-up in a contactless manner.

A problem to provide an improved cable has been solved. A further advantage is that, by having introduced the second distance which is larger than the first distance, the picking-up of the signal can be done more precisely and more efficiently.

These and other aspects of the invention will be apparent from and elucidated with reference to the embodiments described hereinafter.

DETAILED DESCRIPTION OF EMBODIMENTS

Figure 1:
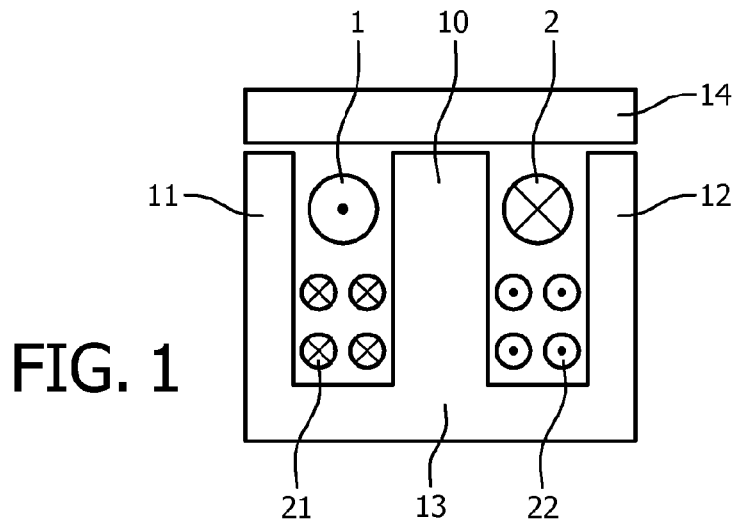
FIG. 1 shows a cross section of a combination of an embodiment of a pick-up device and an embodiment of a cable.
Figure 2:
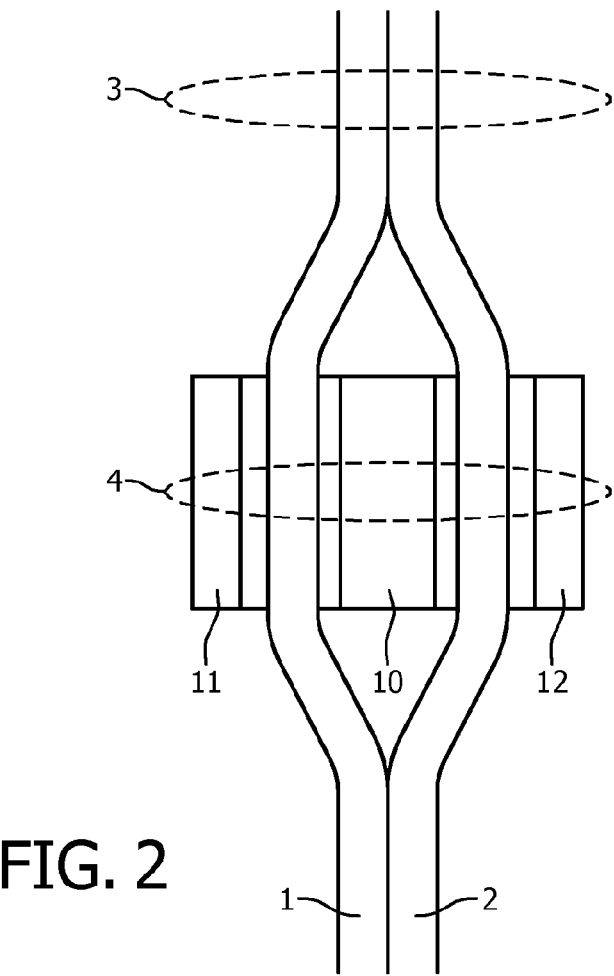
FIG. 2 shows a top view of a combination of an embodiment of a pick-up device and an embodiment of a cable.

In the FIGS. 1 and 2, a cross section and a top view are shown of a combination of an embodiment of a pick-up device and an embodiment of a cable 1, 2. The cable 1, 2 comprises first and second conductors 1, 2 for transporting a signal to be picked-up in a contactless manner. At a first location 3, the first and second conductors 1, 2 are located parallel to each other and at a first distance from each other. At a second location 4, the first and second conductors 1, 2 are located at a second distance from each other. The first location 3 is a neutral location or a non-pick-up location or a passive location, where the cable 1, 2 for example is in a same condition as shortly after being manufactured or as shortly after being sold. The second location 4 is a pick-up location or an active location, where the cable 1, 2 is no longer in the same condition as shortly after being manufactured or as shortly after being sold. The second distance is larger than the first distance, the cross-section has been made at the second location 4.

The first conductor 1 may be surrounded by a first isolation layer, and the second conductor 2 may be surrounded by a second isolation layer. In that case, the first distance may be substantially equal to a sum of thicknesses of the first and second isolation layers. Typically, the first distance may be smaller than the sum of thicknesses if some compression of the isolation layers of the conductors 1, 2, for instance due to the manufacturing process of a twin cable comprising the first conductor 1, second conductor 2 and respective isolation layers, contributes to reducing the first distance. Reciprocally, the first distance may be higher than the sum of thicknesses, for instance if a layer of glue is present between the isolation layers. It can be considered that the term "substantially" shall be understood in this context, to be +/−10% around a nominal (theoretical) value of the sum of thicknesses. The first and second isolation layers may at the first location 3 be interconnected in a disconnectable manner. The first and second isolation layers may at the second location 4 be disconnected. Alternatively, the first conductor 1 and the second conductor 2 may be separated by a single isolation layer or by three or more isolation layers or by two isolation layers which are separated from each other by a distance holder etc. In the latter case, the distance holder may be removed or cut to increase a distance between the first and second conductors 1, 2 from a value of the first distance to a value of the second distance.

The respective first and second conductors 1, 2 may at the second location 4 pass respective first and second sides of a core-part. In that case, the second distance may be substantially equal to or larger than a thickness of the core-part measured from the first side to the second side. The core-part may for example comprise a center end 10 of an E-shaped magnetic core further comprising two outer ends 11, 12 and a back 13. The E-shaped magnetic core may be closed by a magnetic closure 14.

The cable 1, 2 is preferably a flexible cable, with each conductor 1, 2 preferably comprising two or more strands. The signal is preferably a power signal, with the contactless manner comprising an inductive manner, as also discussed at the hand of the FIG. 3. A frequency of the signal may be equal to or larger than 1 kHz.

The pick-up device is arranged for picking-up a signal in a contactless manner from the cable 1, 2. The pick-up device comprises a part for defining a minimum value of the second distance. The part of the pick-up device may comprise the core-part, and the size of the part of the pick-up device may be substantially equal to a thickness of the core-part measured from the first side to the second side of the core-part. The pick-up device may comprise an E-shaped magnetic core comprising a center end 10, two outer ends 11, 12 and a back 13, with the core-part comprising the center end 10. The first conductor 1 and/or the second conductor 2 may form a primary winding 1, 2 of the pick-up device. The pick-up device may further comprise a secondary winding 21, 22 for providing the signal.

Figure 3:
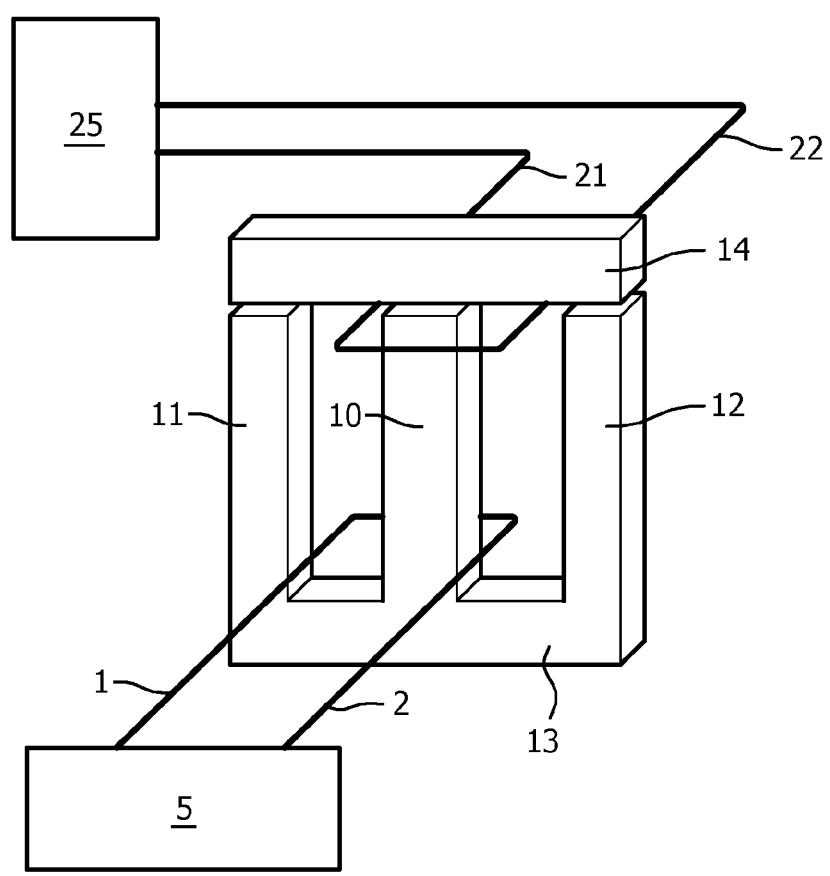
FIG. 3 shows a basic principle of a pick-up in an inductive manner of a signal to be sent by a sender and to be received by a receiver.

In the FIG. 3, a basic principle is shown of a pick-up in an inductive manner of a signal to be sent by a sender 5 and to be received by a receiver 25. The sender 5 is connected to the first and second conductors 1, 2 in an electrically contacting manner. The first and second conductors 1, 2 pass the first and second sides of the center end 10 of the E-shaped magnetic core. After having passed the E-shaped magnetic core, the first and second conductors 1, 2 are short-circuited. Alternatively they may be interconnected via a relatively low impedance value for a given frequency of the signal, for example via a capacitor. A wire 21, 22 comprising a third conductor 21 and a fourth conductor 22 also passes the first and second sides of the center end 10 of the E-shaped magnetic core, possibly several times. First ends of the third and fourth conductors 21, 22 are connected to a receiver 25 in an electrically contacting manner. Alternatively, the third and fourth conductors 21, 22 may be coupled to the receiver 25 in a contactless manner. Second ends of the third and fourth conductors 21, 22 are connected to each other. The receiver 25 may for example comprise a processing unit for i.e. processing the signal and/or a load i.e. driven via the signal.

Usually the wire 21, 22 will be considered to be one wire. The third and fourth conductors 21, 22 are parts of this wire 21, 22. The first conductor 1 and/or the second conductor 2 may be considered to form a primary winding 1, 2 of the E-shaped magnetic core having a transformer function. The wire 21, 22 may then be considered to form a secondary winding 21, 22 of the E-shaped magnetic core. Instead of said E-shaped magnetic core, an other kind of core may be used, such as a core with one opening, with the first conductor 1 going through this opening and with the second conductor 2 passing an outer side of this other kind of core etc.

The pick-up device comprises in a minimum situation said part for defining said minimum value of the second distance. This part of the pick-up device may comprise the core-part etc. In a more extended situation, the pick-up device may comprise a combination of said part and said processing unit in said receiver 25. In both cases, the pick-up device forms an interface between the cable 1, 2 and a load such as a lamp such as for example a light emitting diode circuit comprising one or more light emitting diodes. In a maximum situation, the pick-up device may comprise the interface and the load, whereby the interface may form part of the load etc.

Per sending part comprising a sender 5 and a cable 1, 2, there may be one or more receiving parts each comprising a pick-up device and a receiver 25. One and the same sending part comprising a sender 5 and a cable 1, 2 can be used to supply several receiving parts each comprising a pick-up device and a receiver 25.

A person who wants to install the pick-up device needs to increase a distance between the first and second conductors 1, 2 from a value of the first distance to a value of the second distance at the second location 4. Thereby, a minimum value of the second distance is given by a size of at least a part of the pick-up device, such that this part fits between the first and second conductors 1, 2. Compared to using a twisted cable, a twin-cable 1, 2 or a twin-lead-cable 1, 2 will make an installment of the pick-up device more easy and less time-consuming and less costly etc.

Figure 4:
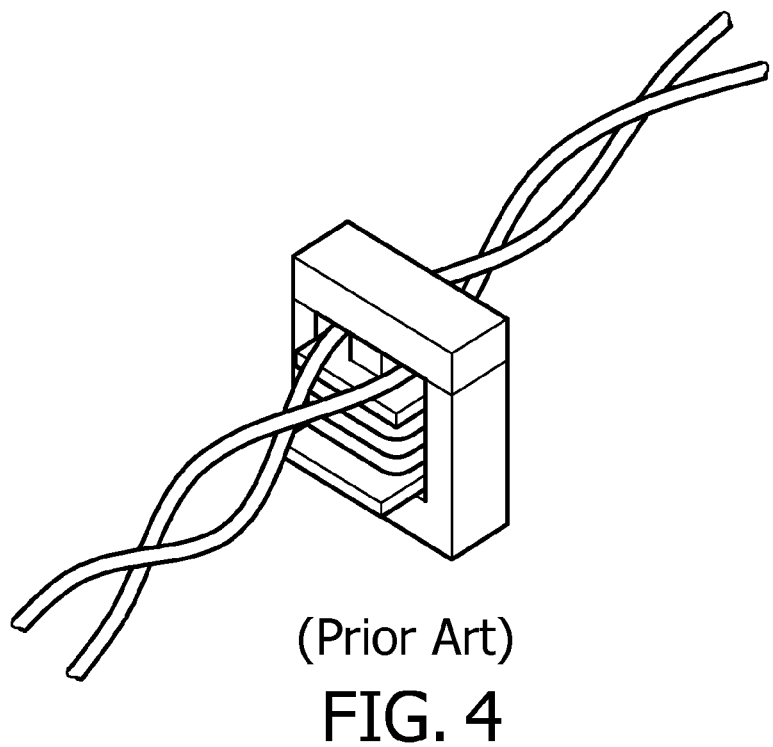
FIG. 4 shows a prior art pick-up.
Figure 5:
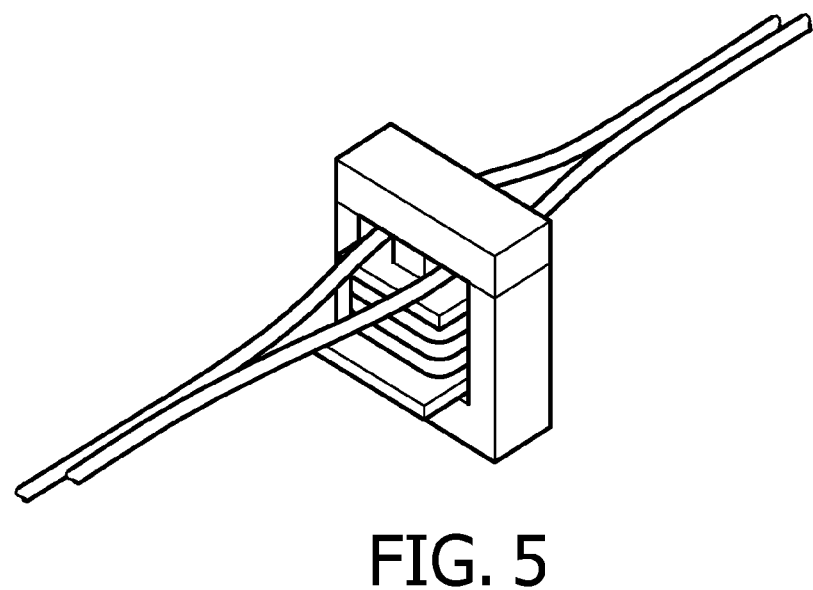
FIG. 5 shows an improved pick-up.

In the FIG. 4, a prior art pick-up for example in accordance with U.S. Pat. No. 4,264,827 is shown, and in the FIG. 5, an improved pick-up is shown.

First and second elements may be coupled directly without a third element being in between or may be coupled indirectly via a third element. The cable comprises first and second conductors, without having excluded a third conductor. Other cores than the E-shaped magnetic cores are not to be excluded. At a neutral location, a distance between two conductors is defined to be the (shortest) distance between outer sides of the non-separated conductors. At a pick-up location, a distance between two conductors is defined to be the (shortest) distance between outer sides of the separated conductors.

Summarizing, cables 1, 2 comprise first and second conductors 1, 2 for transporting signals to be picked-up in contactless manners. At first/second locations 3, 4, the first and second conductors 1, 2 are at first/second distances from each other. The first locations 3 are neutral locations where the conductors 1, 2 are parallel. The second locations 4 are pick-up locations. The second distances are larger than the first distances. Pick-up devices for picking-up signals in a contactless manner from the cables 1, 2 comprise parts for defining minimum values of the second distances. These parts may comprise core-parts, such as center ends 10 of E-shaped magnetic cores further comprising outer ends 11, 12 and backs 13. Methods for installing pick-up devices comprise steps of at second locations 4 increasing a distance between the first and second conductors 1, 2 from a value of the first distance to a value of the second distance. Twin-cables 1, 2 or twin-lead-cables 1, 2 are suited well for allowing signals to be picked-up in contactless manners.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-

The invention claimed is:

1. A cable comprising first and second conductors for transporting a signal to be picked-up in a contactless manner, the first and second conductors at a first location being parallel to each other and at a first distance from each other, the first and second conductors at a second location being a second distance from each other, the first location being a neutral location, the second location being a pick-up location, and the second distance being larger than the first distance, wherein the first and second conductors which are located parallel to each other comprises conductors which are not twisted with respect to each other.

2. The cable as defined in claim 1, the first conductor being surrounded by a first isolation layer, the second conductor being surrounded by a second isolation layer, and the first distance being substantially equal to a sum of thicknesses of the first and second isolation layers.

3. The cable as defined in claim 2, the first and second isolation layers at the first location being interconnected in a disconnectable manner, and the first and second isolation layers at the second location being disconnected.

4. The cable as defined in claim 1, the respective first and second conductors at the second location passing respective first and second sides of a core-part, and a value of the second distance being substantially equal to or larger than a thickness of the core-part measured from the first side to the second side.

5. The cable as defined in claim 4, the core-part comprising a center end of an E-shaped magnetic core further comprising two outer ends and a back.

6. The cable as defined in claim 1, the cable being a flexible cable, and/or each conductor comprising two or more strands.

7. The cable as defined in claim 1, the signal being a power signal, and/or the contactless manner comprising an inductive manner.

8. A pick-up device for picking-up a signal in a contactless manner from a cable comprising first and second conductors, the first and second conductors at a first location being parallel to each other and at a first distance from each other, the first and second conductors at a second location being at a second distance from each other, the first location being a neutral location, the second location being a pick-up location, the second distance being larger than the first distance, the pick-up device comprising a part for defining a minimum value of the second distance, wherein the first and second conductors which are located parallel to each other comprises conductors which are not twisted with respect to each other.

9. The pick-up device as defined in claim 8, the part of the pick-up device comprising a core-part, a size of the part of the pick-up device being substantially equal to a thickness of the core-part measured from a first side to a second side of the core-part, and the respective first and second conductors at the second location passing the respective first and second sides of the core-part.

10. The pick-up device as defined in claim 9, the pick-up device comprising an E-shaped magnetic core comprising a center end, two outer ends and a back, and the core-part comprising the center end.

11. The pick-up device as defined in claim 8, the first conductor and/or the second conductor forming a primary winding of the pick-up device, and the pick-up device further comprising a secondary winding for providing the signal.

12. The pick-up device as defined in claim 8, further comprising a processing unit and/or a load.

13. A system comprising the cable as defined in claim 1 and comprising the pick-up device as defined in claim 8.

14. A method for installing a pick-up device for picking-up a signal in a contactless manner from a cable comprising first and second conductors, the first and second conductors at a first location being parallel to each other comprising conductors which are not twisted with respect to each other and at a first distance from each other, the method comprising a step of at a second location, increasing a distance between the first and second conductors from a value of the first distance to a value of a second distance, the first location being a neutral location, the second location being a pick-up location, and a minimum value of the second distance being defined by a size of at least a part of the pick-up device.

* * * * *